United States Patent [19]
Knusting et al.

[11] 4,026,093
[45] May 31, 1977

[54] HAY-RAKING MACHINE

[75] Inventors: Gregor Knüsting; Karl-Heinrich Ahrens, both of Lengede, Germany

[73] Assignee: Wilhelm Stoll Maschinenfabrik GmbH, Lengede, Broistedt, Germany

[22] Filed: May 3, 1976

[21] Appl. No.: 682,679

Related U.S. Application Data

[63] Continuation-in-part of Ser. No. 553,588, Feb. 27, 1975, abandoned.

[30] Foreign Application Priority Data

Mar. 5, 1974   Germany ............................ 2410453

[52] U.S. Cl. ................................................. 56/370
[51] Int. Cl.[2] ....................................... A01D 79/02
[58] Field of Search ............ 56/370, 372, 365, 366, 56/15.9, 16.1

[56]   References Cited
UNITED STATES PATENTS

| | | | |
|---|---|---|---|
| 2,892,299 | 6/1959 | van der Lely et al. .............. | 56/370 |
| 3,552,773 | 1/1971 | Purrer et al. ..................... | 56/370 X |
| 3,583,139 | 6/1971 | Purrer ................................ | 56/370 |
| 3,690,055 | 9/1972 | Reber ................................ | 56/370 |

Primary Examiner—Russell R. Kinsey
Attorney, Agent, or Firm—Woodhams, Blanchard and Flynn

[57]   ABSTRACT

Hay-raking machine having a plurality of raking means rotatable on vertical axes. The invention relates to the type of hay rake having a plurality, as four, vertically rotatable raking devices supported by ground wheels and connectible to a tractor, as by a conventional three-point attachment means. Frame structure for supporting said raking devices provides for convenient and efficient positioning by an operator without his leaving the tractor seat for adjusting the raking means through a plurality of desired operating positions as well as for moving the raking means into an appropriately compact position for transport of same. Positive drive means are provided for driving from the power output shaft of the tractor for driving said rakes, same being arranged, however, so as to not inhibit moving said rakes into a compact body for transport purposes and at the same time when said rakes are so positioned, to terminate the driving thereof. Other controls are provided and detailed for effecting appropriate adjustment and operation of the rakes with said controls all being accessible by the operator without leaving the operating seat of the tractor.

15 Claims, 15 Drawing Figures

HAY-RAKING MACHINE

This application is a continuation-in-part of U.S. application Ser. No. 553,588, filed Feb. 27, 1975 and now abandoned.

The invention relates to a hay-raking machine having rotary rakes drivingly rotatable about approximately vertical axes of rotation, same being driven from a tractor through a main gear and each rake driven by a drive shaft, having either controlled or not controlled teeth and supported driveably by ground wheels, which rotary rakes are each arranged in groups on auxiliary frames, which in turn are pivotable in support bearings having an approximately vertical pivot axis on a main support frame which latter is carried by the three-point attachment device of the tractor and can be secured in various positions relative to the main support frame.

Certain disadvantages exist in this known machine in that an operator must make the adjustment of an auxiliary frame carrying a group of rotary rakes, which during each adjustment requires a number of various operations and which can lead, further during the adjustment of the inclination of the axes of rotation of the rotary rakes, to different adjustments of the individual rotary rake groups. Also the tractor driver must climb off the tractor each time in order to adjust, or correct the adjustment of, the machine. This is extremely complicated and requires a considerable amount of time.

The objective of the invention is to develop a hay-raking machine of the above-discussed type so that by using simple structural parts the operation is simplified during adjustment of the machine.

This is achieved according to the invention by providing the main support frame with a pull frame part and a support frame part having appropriate support bearings. Said support frame part, seen from above, is supported pivotably relative to the pull frame part by means of an adjusting spindle in a joint with a pivot axis which lies approximately above the wheel axes and parallel thereto.

In the hay-raking machine of the invention the auxiliary frames carrying the rotary rake groups are combined into one unit due to their securement in the support bearings of the support frame part and the inclination of the axes of rotation of the rotary rakes can be adjusted quickly and easily by means of a common adjustment spindle. It is thereby advantageous to arrange the joint existing between the pull frame part and the support frame part, seen from above, approximately above the common geometric axis of the wheels, because in this manner, during inclination of the upper end of the axes of rotation of the rotary rakes, the pull frame experiences only a small change of its elevational position. If the joint is shifted into the area in front of or behind the axis of the wheels, a change of the inclination of the rotary rakes would, however, cause a substantial change of the elevational position of the pull frame part, which would then require an adjustment of the length of the upper rod of the three-point attachment device in order to reach the operating position of the machine. In the inventive position of the pivot axis, this adjustment is not needed since the elevational position is only slightly changed.

A further development of the invention provides for operation of the adjusting spindle from the tractor seat. The tractor driver does not need to leave the tractor seat in this development of the inclination adjustment and a possibly necessary corrective adjustment of the inclination of the rotary rakes can be made also from the tractor seat during travel.

An exemplary embodiment of the invention provides that the support frame part is a support which has a V-shaped construction and points with its tip backwardly of the direction of travel of the machine, the tip of said support lying in the plane of symmetry of the machine and the pull frame part being hinged to the joint in the center part of said support. The use of such a V-shaped constructed support frame part has the advantage that the joint for the pull frame part can be secured without any additional frame parts at the required point, namely, seen from above, lying approximately above the wheel axes.

A further development of the invention provides that the drive shafts starting from the main gear each extend into the area of the support bearings and a second drive shaft piece, which has two universal joints and which is coupled with the rotary rake gears, is provided following the zone of the support bearings in the direct vicinity of the support bearing for forming a bend for the drive connection.

The arrangement of these two universal joints in the zone of the support bearing has the considerable advantage, that the drive shaft, which is arranged between the main gear and the pivot provided in the zone of the support bearing, may remain assembled during pivoting of the machine into its transport position and no longer needs to be separated in the zone of the support bearing as is the case in the hay-raking machine mentioned above. The two universal joints provided in the zone of the support bearing easily permit, namely by avoiding wide-angle joints, the required angles of traverse, because in the transport position the shafts are not driven.

The invention further provides that for pivoting the auxiliary frames from their operating position into their transport position, a traction cable is provided which engages at one end the auxiliary frame or a common part pivotable with same and at the other end an adjusting part of an adjusting spindle which can be operated from the tractor seat. By means of such a traction cable which can be adjusted by an adjusting spindle, an adjustment of the machine from the operating position into its transport position is possible in a simple manner from the tractor seat.

A further development provides that the traction cable is guided each over a guide roller which is rotatably supported at one outer end of a rocker arm which is supported pivotably with its center part on the support frame part and a release cable engages the other end of the rocker arm, which release cable is coupled with a notch arm which effects the locking between the auxiliary frame and the support frame part.

In the aforementioned exemplary embodiment only the adjusting spindle must be operated to adjust the machine. The notch arm which is provided between the support frame part and the auxiliary frame is released automatically by the rocker arm which carries the release cable at one end and the guide roller at the other end. The traction cable which is guided over the guide roller is tensioned during operation of the adjusting spindle, which causes a pivoting of the rocker arm and thus an unlocking of the notch arm by means of the release cable.

To further facilitate the operation, it is provided that the traction cable engages the auxiliary frame with its one end on the one side and with its other end on the other side of the support bearing or a part pivotable together with same and is movable by means of the adjustable part of the adjusting spindle both in the one and also in the other direction.

This embodiment also has the advantage that the machine can be pivoted both from an operating position into the transport position, and vice versa from the transport position into the operating position solely by operating the adjusting spindle. The lock can in this exemplary embodiment also be released by means of a rocker arm which at one end carries the guide rollers and at the other end carries the release cable which is coupled with the notch arm. In place of the adjusting spindle it is of course also possible to provide a hydraulic operating mechanism for the adjusting of the auxiliary frames relative to the support frame part. It is also possible to use different operating means in place of the traction cable.

A further embodiment of the invention provides that the auxiliary frames carrying the rotary rakes have joints with pivot axes which joints approximately parallel the ground in the direction of travel of the machine, the distance of which axes from the axes of rotation of the inner rotary rakes is less than the distance from the axes of rotation of the outer rotary rakes.

These joints between the support frame part and the auxiliary frame permit on the one hand a good ground adaptation of the individual rotary rake groups and on the other hand the shifting of these joints toward the machine center provides in a simple manner that the support bearings of the support frame part can also be arranged further toward the machine center, through which during pivoting together of the auxiliary frames in their transport position a small transport width is achieved.

To prevent the one-sided lowering of the auxiliary frames during lifting of the machine a further development of the invention provides that a carrying chain is provided between a holding flange and the longer part of the auxiliary frame, which longer part lies in the zone above the pivot axis and is connected with the support frame part.

During lifting of the support frame part by means of the tractor's hydraulic mechanism, after a short distance of lift the carrying chain is tensioned and the longer part of the auxiliary frame is lifted with it.

It is advantageous in this connection if the carrying chain has a spring element which yields under the action of a tractive force. If the machine is quickly lifted, this spring element prevents the occurrence of a sudden load between the support frame part and the auxiliary frames.

To adjust for various carrying lengths, the carrying chain can include a piece which is adjustable in length.

A further development of the invention provides that the holding flange provided on the support frame part lies, as seen in direction of travel of the machine, in the area in front of the support bearings. This special position of the holding flange causes the carrying chains in the transport position to be tensioned after only a small lift of the support frame part, while in the operating positions the carrying chains are tensioned only after a greater height of lift. The floating position of the auxiliary frames relative to the support frame part is thus greater in the operating position, which permits a desirable ground adaptation of the machine.

The invention is illustrated in the drawings in connection with one exemplary embodiment and will be described more in detail hereinafter.

FIGS. 1 to 5 illustrate a hay-raking machine 1, which can be attached to the conventional three-point coupling device (portions of which are illustrated at 121, 122 and 123 in FIGS. 3 and 3A) of a tractor (not shown) by means of a three-point attachment frame or bracket 2.

Figure 1:
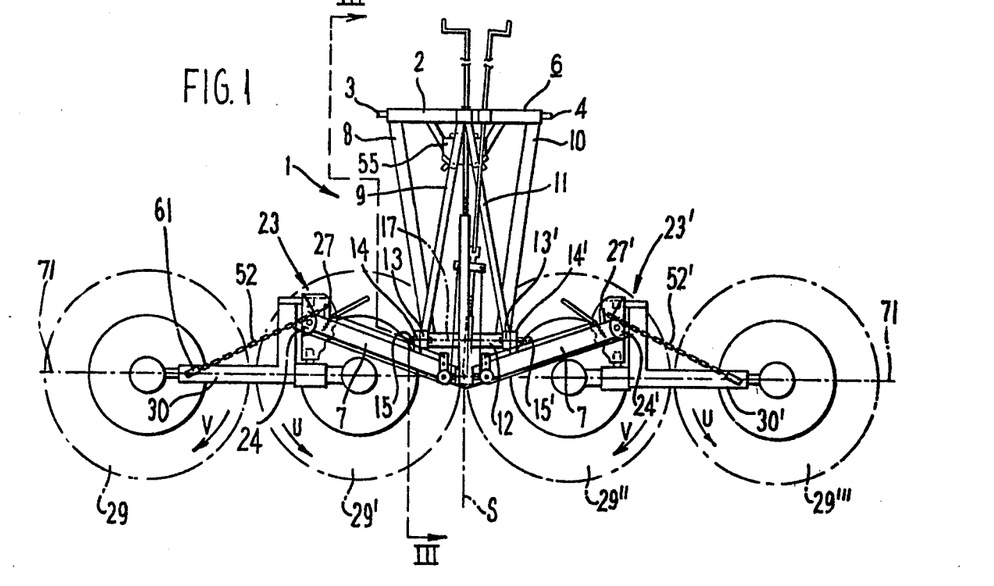
FIG. 1 is a schematic top view of a hay-raking machine with four rotary rakes in a first operating position, the axes of rotation of said rotary rakes lying in said operating position in a plane which extends transversely to the direction of travel of the machine.

FIG. 1 illustrates the machine in a position, in which the operations "tedding, turning" and also the forming of two individual swaths can be carried out. The rotary rakes of one rotary rake group are always oppositely arranged.

Figure 2:
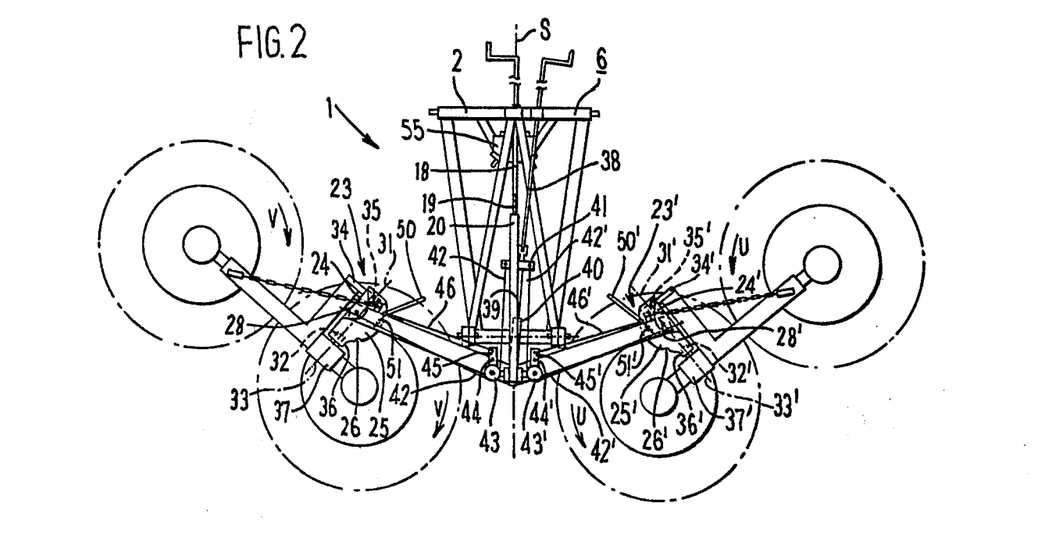
FIG. 2 illustrates the machine according to FIG. 1 in a second operating position, in which the rotary rake groups are adjusted in a V-shaped pattern with respect to one another.

The rotary rakes are, in the operating position according to FIG. 2, always arranged V-shaped with respect to one another and the rotary rakes of one rotary rake group rotate always in the same direction of rotation U or V. This operating position is intended for forming a large center swath.

Figure 3:
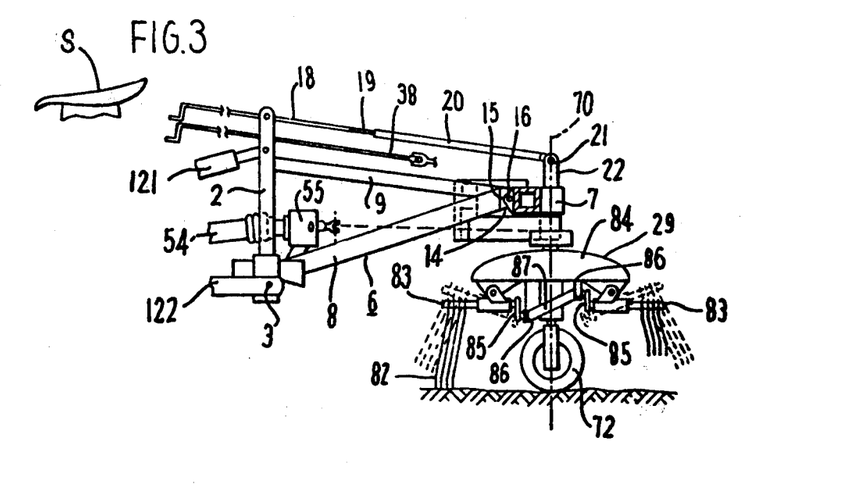
FIG. 3 is a schematic partially broken side sectional view of the machine substantially taken on the line III—III of FIG. 1, and including a portion of the rake drive means.

The crossbar of the conventional three-point attachment frame 2, which crossbar carries the lower pivots 3, 4, has pivot pin means 124 (FIG. 3A) having an approximately vertical pivot axis, about which the machine 1 is supported for lateral pivoting in order to permit during working a pivoting between the tractor and the machine. The main support frame of said machine consists of a pull frame part 6 and a V-shaped support frame part 7. The pull frame part 6, which at its end facing the tractor includes the three-point attachment frame 2, has support arms 8, 9, 10, 11 which slope rearwardly, which support arms are connected to a crossbar 12. The crossbar 12 of the pull frame part 6 is hinged to the support frame part 7, through flanges 13 and 13' which are secured on the crossbar 12 and are connected by bolts 15 and 15' with counter-flanges 14 and 14' secured on the support frame part 7, so as to form a pivot joint 16 having an axis 17. The support frame part 7 is supported and adjustable pivotally about the axis 17 with respect to the pull frame part 6 by means of an adjusting spindle 18 which can be operated from the tractor seat, and which with its threaded portion 19 engages a tubular portion 20 constructed as a spindle nut, which tubular portion, as particularly shown in FIG. 3, is pivotally connected through a joint 21 of a lever 22 which is rigidly secured onto the support frame part 7.

Figure 4:
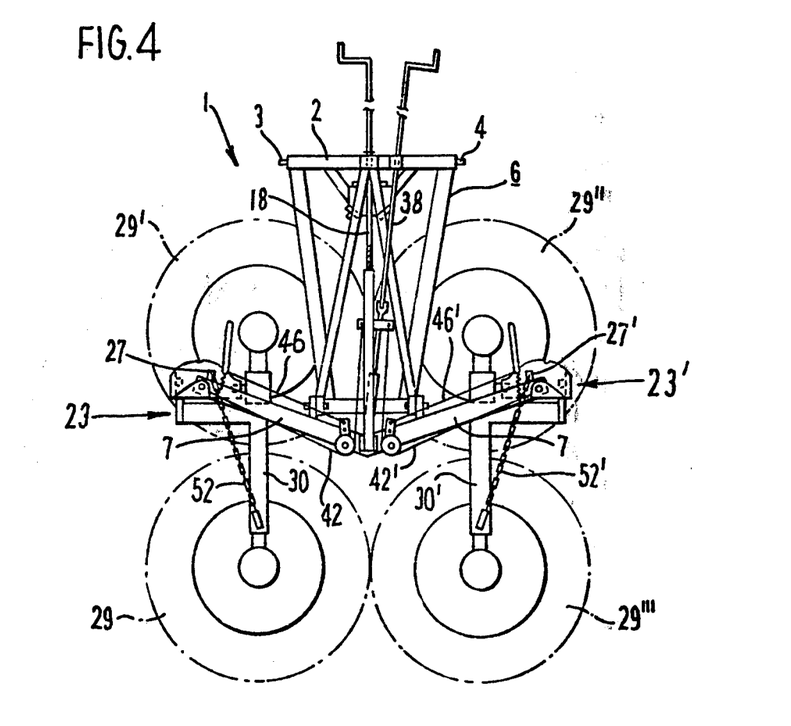
FIG. 4 is a schematic top view of the machine shown in FIG. 1 in its transport position.

As shown schematically in FIGS. 1, 2 and 4, leftward and rightward support bearing means 23 and 23' are provided at the outer ends of the support frame part 7. Attached to the outer ends of support frame part 7, through such support bearing means 23 and 23', are auxiliary frames 30 and 30', respectively, which carry rotary rakes 29, 29' and 29", 29''', respectively. Each such auxiliary frame 30 and 30' is pivoted about two axes with respect to the corresponding end of the support frame part 7 as hereafter discussed.

The leftward support bearing means 23 and associated structure hereafter discussed are shown in detail in FIGS. 5 and 5A–5D, and a discussion thereof will also serve for corresponding portions of the leftward support bearing means 23' and associated structure, which are referred to by the same reference numerals, with "prime" marks added.

Figure 5:
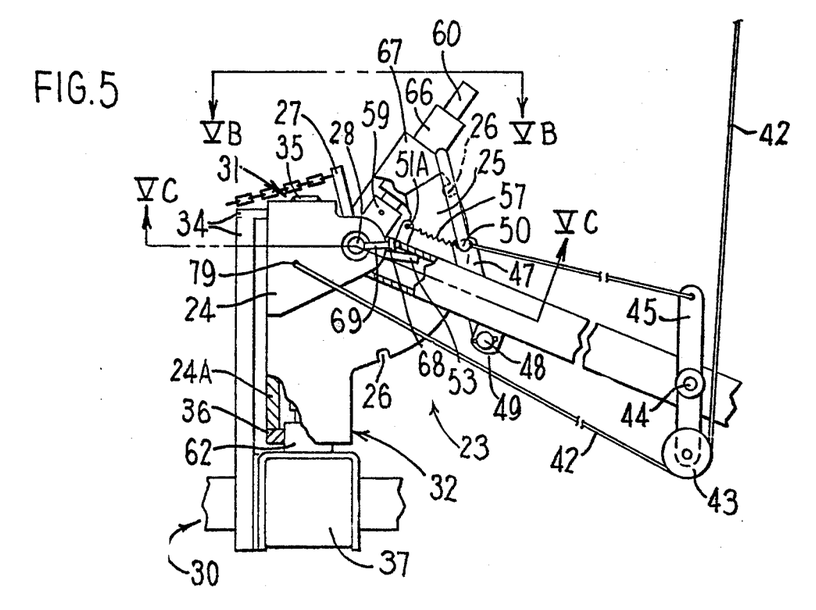
FIG. 5 is a fragmentary enlarged top view of the machine shown schematically in FIG. 1.
Figure 5A:
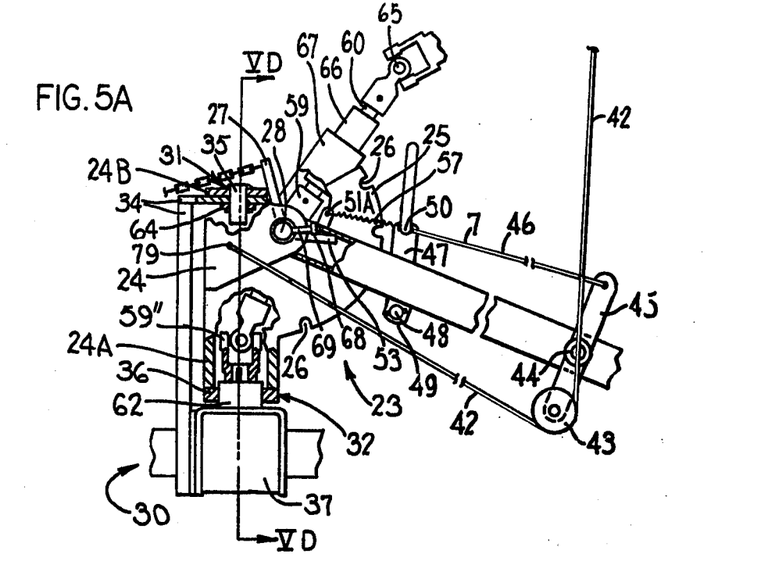
FIG. 5A is a fragmentary top view similar to FIG. 5 but partially broken to show components of the rake drive means and with the release cable pulled to permit pivoting of the corresponding rotary rake group to a different operating position.

As seen in FIG. 5A, the support bearing means 23 includes a pivot piece 24 pivotally mounted with respect to the adjacent outer end of the support frame part 7 by a vertically arranged pivot pin 28. The pivot pin 28 is fixed to the end of support frame part 7 and pivotally engaged by upper and lower plates of pivot piece 24. The lower plate of the pivot piece 24 is a locking segment 25 edged by locking grooves 26. The support bearing means 23 also includes a holding flange 27 (FIGS. 5B and 5C) hereafter discussed.

The pivot piece 24 in turn pivotally engages the corresponding auxiliary frame 30 through coaxial pivot joints 31, 32 defining a pivot axis 33 which, in the operating position shown in FIGS. 1 and 5A, is parallel to the longitudinal axis of the machine. The rearward pivot joint 32 (FIG. 5A) comprises a forwardly extending bearing neck 62 on a rotary rake gear unit 37 of the auxiliary frame 30. A bearing 36 on the extended bearing neck 62 pivotally secures a pendent rearward end portion 24A (here of inverted U-shape) of pivot piece 24 to the auxiliary frame 30. The forward pivot joint 31 includes a sheet metal holder 34 fixed to and extending forwardly from the auxiliary frame 30 adjacent the gear unit 37 and which includes a portion adjacent the forward end of pivot piece 24. A pivot bolt, or pin, 35 is here fixed to a pendent forward portion 24B of the pivot piece 24 and is pivotally engaged in a bearing 64 on the sheet metal holder 34. Thus, auxiliary frame 30 is pivotable with respect to pivot piece 24 about the common pivot axis 33 defined by bearing neck 62 and pivot bolt 35.

The rotary rakes 29, 29' and 29", 29''' are pivotable with their respective auxiliary frames 30 and 30' from one operating position into a different operating position or into a transport position, as schematically shown in FIGS. 1, 2 and 4, respectively.

The rotary rakes 29, 29', 29", 29''' are easily adjusted from one of the operating positions shown in FIGS. 1 and 2 into the transport position of FIG. 4 by an adjusting spindle 38 (FIG. 2) which is preferably of sufficient length that it can be operated from the tractor seat (schematically indicated at S in FIG. 3), and which with its threaded part 39 engages a tubular part 40, which is constructed as a spindle nut and is secured rigidly on the support frame part 7. The adjusting spindle 38 is connected to an adjusting part 41, to the opposite ends of which traction cables 42 and 42' are connected. The apparatus now discussed, by which adjusting spindle 38 can thus adjust the rotary rakes to their transport position, is shown in detail in FIGS. 5 and 5A as to the leftward part of the machine and schematically in FIG. 2 as to the similar right and left parts of the machine. The remaining ends of such traction cables 42 and 42' respectively connect to the pivot pieces 24 and 24' as by pins, one of which is shown at 79 fixed atop the upper plate of pivot piece 24 in FIG. 5. A guide roller 43 or 43' secured rotatably on the rearward end of a rocker arm 45 or 45' supports the intermediate portion of traction cable 42 or 42'. Said rocker arms are centrally supported pivotally on the center part of the support frame part 7 by means of pivot bolts 44 or 44', respectively. A releasable cable 46 or 46' connects the other, forward end of the rocker arm 45 or 45' to a notch arm 47 or 47' which effects locking between the support frame part 7 and the respective auxiliary frame 30, 30'. More particularly, and as is shown in FIGS. 4A–5C, the leftward notch arm 47, for example, is supported pivotally through a pin 48 on a flange 49 secured on the support frame part 7. A locking piece 50 or 50', which is rigidly connected to the notch arm 47 or 47' and which engages the locking groove 26 and 26' of the locking segment 25 or 25', is held in a locking position by a spring 51 or 51', which is suitably fixed (as by the bracket 51A in FIGS. 5A and 5B) on the support frame part 7. This device permits in a simple manner changing of the hay-raking machine from its operating position into its transport position and doing so from the tractor seat, so that the driver does not need to leave the tractor seat for this adjustment.

To adjust the rotary rakes from an operating position to their transport (FIG. 4) position, adjustment screw 38 is manually rotated to move adjusting part 41, and therewith cables 42 and 42' forward. Since the left and right parts of the machine are constructed and operate in a mirror imaged manner, the following discussion of operation will suffice for both. The forward pulling of the forward end of cable 42 (FIG. 5) cannot yet pivot the pivot piece 24 (which is locked in place by locking piece 50) and thus must start to straighten the mid portion of cable 42 bent around pulley 43. This rotates pulley 43 and pushes it leftward, pivoting rocker arm 45 clockwise around pivot bolt 44, the rocker arm then pulling release cable 46 and thereby disengaging locking piece 50 from the corresponding locking groove in locking segment 25. This unlocked condition is shown in FIG. 5A. Thereafter, continued forward movement of the forward end of traction cable 42 pivots the pivot piece 24 (and thus auxiliary frame 30 with its rotary rakes) counterclockwise to the FIG. 4 transport position. Spring 57 returns locking piece 50 leftward into locking engagement with the rearmost locking groove 26 as transport position is reached and cranking of adjustment screw 38 is stopped.

Figure 7:
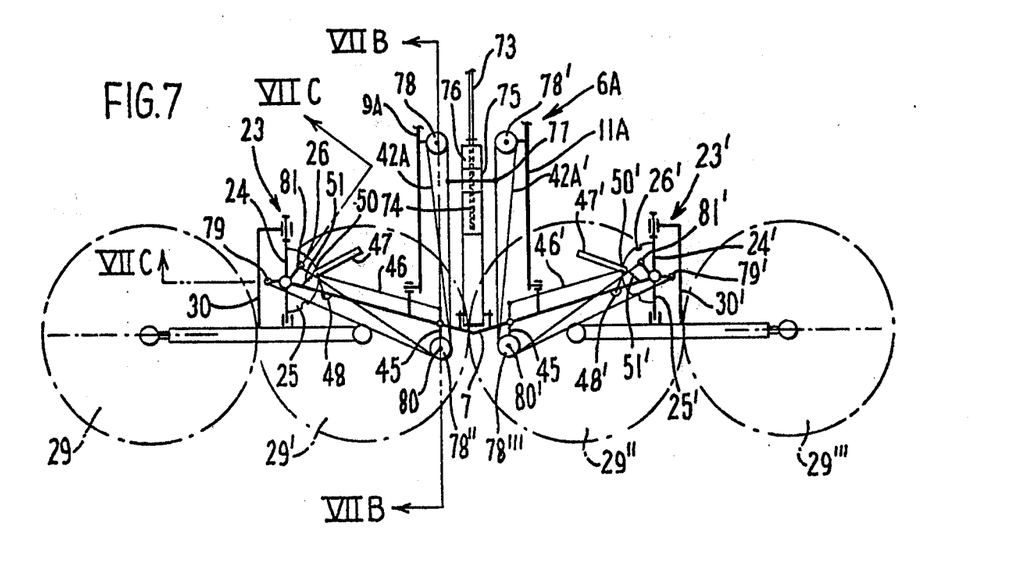
Figure 7A:
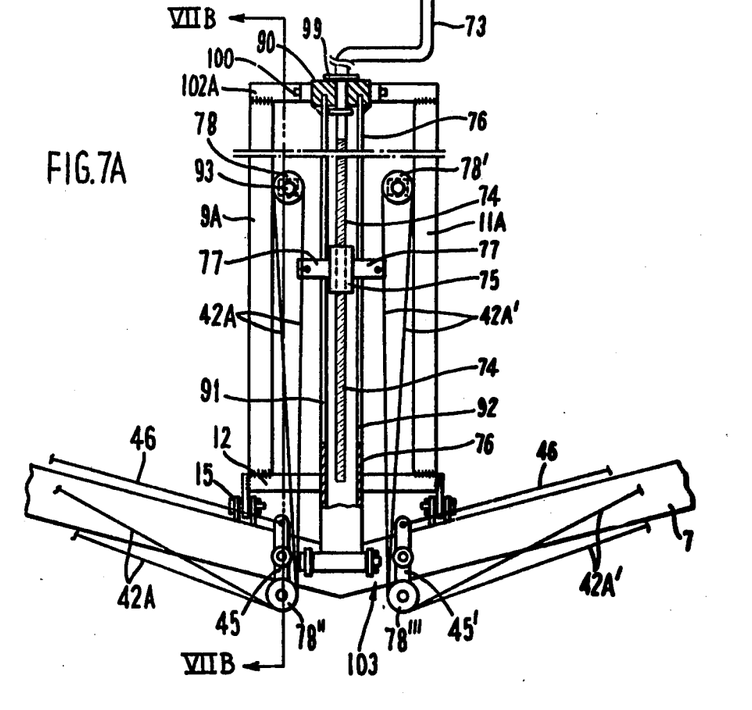
FIG. 7A is an enlarged, fragmentary, partially broken, and enlarged view of the central portion of the apparatus schematically illustrated in FIG. 7.
Figure 7B:
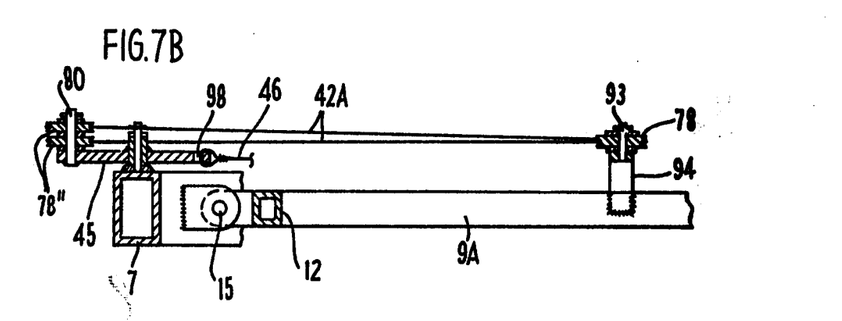
FIG. 7B is a fragmentary sectional view substantially taken on the line VIIB—VIIB of FIG. 7A, the section line VIIB—VIIB also being indicated in FIG. 7 for convenience in orientation.
Figure 7C:
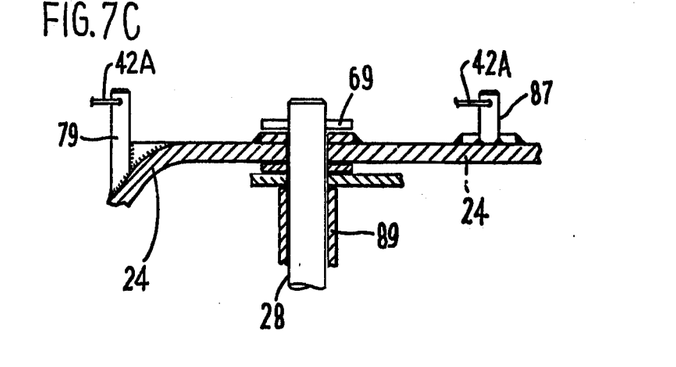
FIG. 7C is an enlarged fragmentary view substantially taken on the line VIIC—VIIC of FIG. 7 and particularly showing the lock, or anchor, pins to which the ends of the traction and release cables attach.

A modified adjusting device, which permits not only the above-described changing from an operating position into a transport position but also the reverse, is schematically illustrated in FIG. 7 and in more detail in FIGS. 7A-7C. To facilitate support of the modified adjusting structure hereafter described, the pull frame part is preferably modified somewhat as indicated at 6A in FIGS. 7 and 7A such that its upper support arms 9A and 11A are spaced apart somewhat further at the forward ends, than in the case of above-described support arms 9 and 11 of FIG. 1. The forward ends of support arms 9A and 11A are joined by a crossbar 102A which is conveniently fixed to or replaces the upper crossbar 102 of the three-point attachment frame 2 of FIGS. 1 and 3A.

The adjusting spindle 73, preferably located for operation from the tractor seat, has its forward portion rotatably mounted in a spindle bearing 90 (FIG. 7A) fixed with respect to crossbar 102A. Discs 99 and 100 secure the spindle 73 against longitudinal displacement with respect to bearing 90. The adjusting spindle 73 includes a threaded part 74 on which is threaded a spindle nut 75 in turn guided by a tubular piece 76 fixed with respect to the pull frame part 6A. The tubular piece 76 has lateral slots on both sides thereof which extend over a portion of its length. Parts 77 of the spindle nut 75 pass laterally outward through the slots 91 and 92 to prevent rotation of the spindle nut while permitting lontigudinal motion thereof. The rearward end of the tubular piece 76 is pivotally mounted at 103 (FIG. 7A) centrally of the support frame part 7.

Traction cables 42A and 42A' (here similar to but longer than traction cables 42 and 42' above discussed) are respectively fixed to the outer ends of part 77. Thus, rotation of the adjustment spindle 73 displaces the spindle nut 75 longitudinally along the tubular piece 76 and accordingly longitudinally moves the traction cables 42A and 42A' forwardly or rearwardly.

The traction cables 42A and 42A' are guided over respective forward guide rollers 78 and 78'' and respective rear guide rollers 78' and 78'''. The free, or laterally outboard, ends of leftward traction cable 42A pivotally connect to corresponding locking bolts or pins 81 (FIG. 7C and schematically in FIG. 7) and 79 (also shown in FIG. 5) which fixedly connect to the pivot piece 24 for horizontal pivoting of auxiliary frame 30 about the vertical axis pivot pin 28. The additional pin 81 is preferably fixed atop the upper plate of pivot piece 24 on the opposite side of pivot pin 28 from locking pin 79. Similarly, the free ends of rightward traction cable 42A' connect to locking bolts 79' and 81' schematically shown in FIG. 7 as being fixedly connected to pivot piece 24' for corresponding pivoting of auxiliary frame 30'.

In more detail, and using leftward traction cable 42A as an example, its forward guide roller, or pulley, 78 is rotatably mounted on a pin 93 (FIG. 7B) in turn fixed to the support arm 9A by a holder 94. The corresponding rear guide roller 78'' differs from pulley 43 of FIG. 5 in being a dual unit having two stacked pulleys. The pulleys 78'' are rotatably mounted on a bearing pin 80 on the rear end of the rocker lever 45, which in turn is pivotally mounted (here by a bearing pin 97) upon support frame part 7 as above-discussed with respect to FIG. 5. Also as above-discussed, the release cable 46 extends from the rocker lever 45 (which may have a hole 98 for attachment thereto) to the notch arm 47 pivoted on support frame part 7 (FIGS. 5 and 5A). As seen in FIGS. 5 and 5A, the locking piece 50, rigidly connected to notch arm 47 and engageable with a selected one of the locking groups 26 of locking segment 25, is held in locking position by spring 51, which is suitably secured to the support frame part 7, as at 51A (FIG. 5A).

To pivot the auxiliary frames 30 and 30' from one operating position to another with respect to the support frame part 7, the cables 42A and 42A' are tensioned by rotation of adjusting spindle 73 to move spindle nut 75 forward or rearward and pull with it one reach of each of traction cables 42A and 42A' while slackening the other reach thereof. The following operation description is for leftward auxiliary frame 30 but will be understood to apply to mirror imaged rightward frame 30' also. The pulled or tensioned reach of cable 42A, being at this time fixed at its outboard end (at 79 or 81 in FIG. 7 or 7C), thus tends to straighten where it is bent around its corresponding pulley unit 78'' (FIG. 7A), thereby pivoting the rocker arm 45 clockwise. The pivoting rocker arm 45 pulls inboard on the cable 46, releasing the notch arm 47 from the engaged locking groove 26, as above discussed with respect to FIGS. 5 and 5A. Continued adjustment of adjusting spindle 73 maintains the notch arm 47 disengaged from pivot piece 24 and pulls the tensioned reach of traction cable 42A past the corresponding roller 78'' so as to pull the corresponding one of pins 79 and 81 toward such roller. This necessarily pivots the pivot piece 24, and auxiliary frame 30, about pivot pin 28, such pivotal movement being clockwise or counterclockwise depending on which of the reaches of cable 42A has been pulled. Accordingly, the modification of FIGS. 7 and 7A-7C permits adjustment of the auxiliary frame 30 both to and from any of its several positions, such as the positions shown in FIGS. 1, 2 and 4.

In the same manner, the adjustment spindle 73 pivots the rightward auxiliary frame 30' and pivot piece 24' the apparatus associated with these elements being a mirror imaged version of that above discussed with respect to auxiliary frame 30 and pivot piece 24 and indicated by the same reference numerals with "prime" marks added thereto.

In place of the adjusting spindle 73, for example, it is of course also possible to provide a hydraulic operating device for the adjustment of the auxiliary frames relative to the support frame part. It is also possible to use in place of the cables other operating means or unlocking devices.

To avoid a one-sided lowering of the auxiliary frames 30 or 30' during lifting of the rotary rakes 29, 29', 29'', 29''' into the transport position, carrying chains 52 and 52' (FIG. 1) are each hinged to the longer part of the auxiliary frames 30 or 30', which carrying chains are each secured with its other end to a holding flange 27 or 27' schematically indicated in FIG. 1 as mounted on the support bearing means 23 or 23'.

Figure 5B:
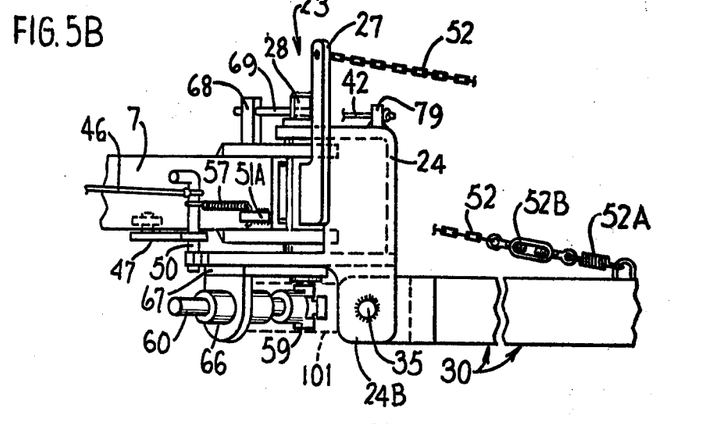
FIG. 5B is a fragmentary sectional view substantially as taken on the line VB—VB of FIG. 5.
Figure 5C:
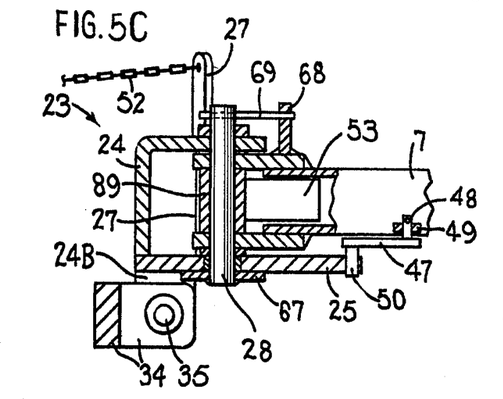
FIG. 5C is a fragmentary sectional view substantially taken on the line VC—VC of FIG. 5.

The holding flanges 27 and 27' are here mirror images of each other and arranged with respect to support bearing means 23 and 23' in the same manner. The following description of holding flange 27 will suffice for holding flange 27' as well. As detailed in FIG. 5C, the holding flange 27 is supported rotatably on pivot pin 28 of support bearing means 23 by fixed engagement with a sleeve 89 rotatable on the pivot pin 28. A free end or tab 53 is also fixed to the sleeve 89 and is pivotable with holding flange 27. The free end 53 extends into the interior of the hollow support frame part 7, the latter being made of square tubing. Thus, the holding flange 27 can be pivoted about pivot pin 28 only to a limited extent, the free end 53 of the holding flange being movable freely only between the sidewalls of support frame part 7, thereby making possible various locking positions of the holding flange 27 for the support chain 52, depending on the respective operating or transport positions of the associated auxiliary frame 30. Preferably, the chain 52 is provided, here at outer end 61, with a cushioning tension spring 52A and a length adjustment device (such as a turnbuckle) 52B, as seen in FIG. 5B. Corresponding components associated with holding flange 27', e.g. in FIG. 1, are indicated by similar but primed reference numerals and operate in the same manner.

Figure 3A:
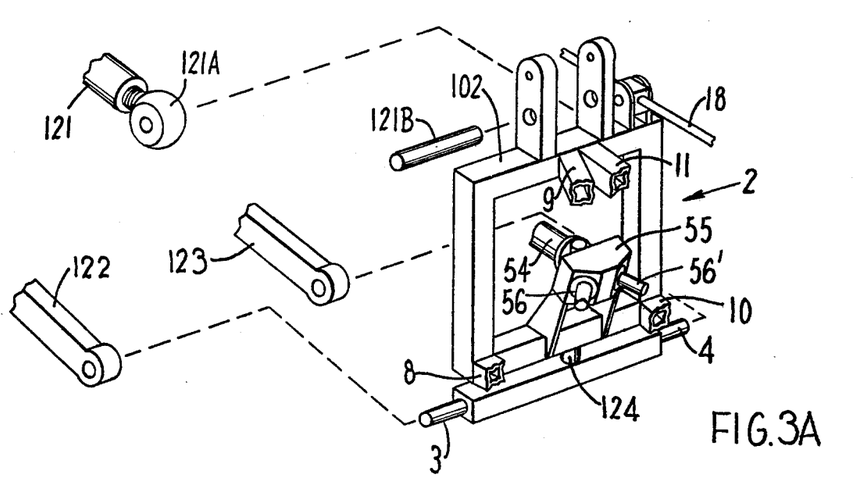
FIG. 3A is a somewhat schematicized, exploded, fragmentary, oblique view of an attachment frame portion of the machine.
Figure 5D:
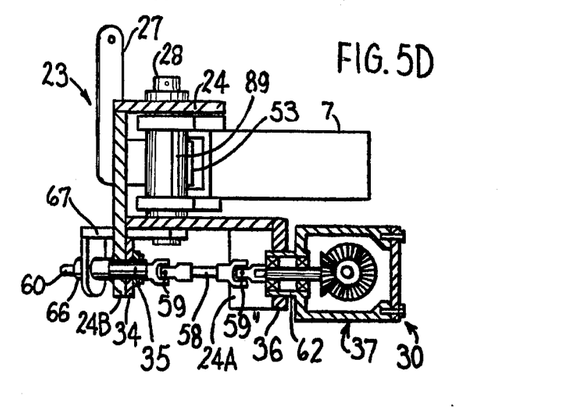
FIG. 5D is a fragmentary sectional view substantially as taken on the line VD—VD of FIG. 5A, which section line VD—VD also appears, for convenience in orientation, on FIG. 6 mentioned below, FIG. 6 schematically illustrates the arrangement of the drive connections and the position of the axis provided between the support frame part and the pull frame part, and FIG. 7 schematically illustrates an adjusting mechanism for the rotary rakes, which adjusting mechanism can be operated by means of traction cables.
Figure 6:
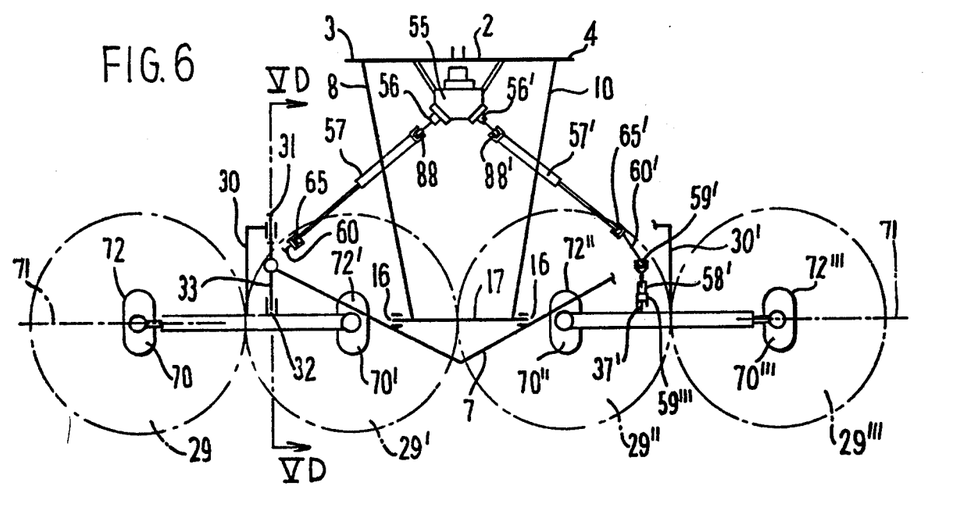

Turning to FIGS. 3, 3A, 5D and 6, the machine 1 is driven through a power-take-off shaft 54 (FIGS. 3 and 3A) conventionally drivable from the tractor and which in turn conventionally drives a main gear unit 55 carried by the attachment frame 2. The main gear unit 55 has two output drive shafts 56 and 56' (FIGS. 3A and 6). The drive shafts 56 and 56' extend from the rearward end of main gear unit 55 and through leftward and rightward drive systems hereafter described ultimately drive and rotary rake gear units 37 and 37' schematically shown in FIG. 2, which in turn conventionally rotatably drive leftward rotary rakes 29, 29' and rightward rotary rakes 29" and 29''', respectively. The drive systems here comprise extensible shafts and universal joints as hereafter detailed with respect to the leftward drive system.

The leftward drive system, serving leftward rotary rakes 29, 29', includes a drive shaft 57 driven from shaft 56 through a universal joint 88. The drive shaft 57 extends beneath support arm 8 free of engagement therewith. To obtain a relatively large area of swing for pivoting the auxiliary frame 30, with its rotary rakes 29, 29', the drive shaft 57 is connected through a further universal joint 65 to an intermediate shaft 60, as shown for example in FIGS. 5A and 5D. The intermediate shaft 60 connects to a drive shaft piece 58 adjacent the support bearing means 23. The drive shaft piece 58 is equipped with two universal joints 59 and 59". The universal joint 59" connects to the rotary rake gear unit 37 from which the rotary rakes 29, 29' are rotatably driven in a conventional manner.

The universal joints 59, 59' and 65 are disposed beneath the lower plate of pivot piece 24 as illustrated in FIG. 5D. The universal joint 59 has its joint axis positioned on the downward extension of the axis of the pivot pin 28, so that the auxiliary frame 30 can swing about the pivot pin 28 relative to the support frame part 7 without disconnecting or breaking the drive system.

A support arm 67 (FIGS. 5A–5D) is fixed to and extends radially from the lower end of pivot pin 28 above the universal joint 59 and drive shaft 60. A bearing 66 dependent from the outer and forward end of the support arm 67 rotatably supports the shaft 60. The pivot pin 28 is fixed with respect to the support frame part 7, here by means of a pin 69 fixed to the upper end of and engaged by a bracket 68 fixed atop the support frame part 7.

As seen in FIG. 5B, a flexible protective tube 101 may enclose portions of the drive system, as here with universal joints 59 and 59' and intervening shaft 58. Due to the forward and inward angling of the drive shaft system, including drive shaft 58 and universal joint 59, the latter drive components are laterally inwardly offset from pivot bolt 35, so as to not interfere therewith, despite coaxial alignment of the pivot bolt 35 with the rake gear unit 37 and its input universal joint 59".

In the left hand portion of FIG. 6, the support of the auxiliary frame 30 by joints 31 and 32 is schematically illustrated, along with the pivot axis 33 which in the operating position shown lies approximately parallel to the longitudinal axis of the machine.

The rightward drive system is preferably similar to but a mirror image of the leftward drive system above-detailed. The rightward drive system is shown schematically in FIG. 6. Corresponding components of the two drive systems are referred to by the same reference numerals, those for the rightward drive system being primed.

FIG. 6 schematically illustrates further a particularly advantageous position of the axis 17, about which the support frame part 7 is supported pivotably with respect to the pull frame part 6. Particularly, the axis 17 is arranged in such a manner that, seen from above, it forms together with the common geometric axis 71 of the wheels 72, 72', 72", 72''', which axis 71 extends transversely to the direction of travel of the machine, approximately a single straight line.

This position of the axis 17 shown in FIG. 6 is very advantageous because during a tilting of the upper end of the rake axes of rotation 70, 70', 70", 70''' forwardly in direction of travel, as is necessary for example during the operation of "tedding", the elevational position of the pull frame part 6 experiences only a small change. If this axis 17 were instead shifted into the area in front of or behind the common geometric axis 71 of the wheels 72, 72', 72", 72''', a greater change of the elevational position of the pull frame part 6 would take place, which would require a change of the length of the upper rod of the three-point attachment device.

During the aforementioned operation of "tedding", the teeth 82 of the rotary rakes 29 are, as shown by dashed lines in FIG. 3, connected rigidly through their support arms 83 to a rotatably driven pivot mounting 84 of the rotary rakes 29. The raked material is discharged in this operating position alone by the already discussed tilting of the axes of rotation of the rotary rakes 29. During the operations "turning" and "swathing", the support arms 83 carrying the teeth 82 are controlled during rotation of the pivot mounting 84 from a right position into a removal position and vice versa. Such controlled teeth carry out a particularly exact and clean raking operation for the respective working operations.

In FIG. 3A, the members 121, 122 and 123 are conventional three-point hitch members pivoted on and extending rearward from the tractor. Conventionally, lower hitch members 122 and 123 are hydraulically pivotable up and down by means on the tractor and the upper member 121 is freely pivotable up and down and provided with a swivel (e.g. ball) joint on its rear end as shown at 121A. As seen in FIG. 3A, member 121 (through ball joint 121A and cross shaft 121B) and members 122 and 123 (through pins 3 and 4) provide for raising and lowering of attachment frame 2 and hence machine 1. Also, the ball joint 121A and pivot pin 124 coaxial therewith permit horizontal pivoting of attachment frame 2 and machine.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A hay-raking machine for use with a tractor having a three-point attachment device and a power takeoff, said machine including:
   a main support frame carried by said three-point attachment device of said tractor and carrying support bearings each providing an approximately vertical pivot axis;
   auxiliary frames each pivoted about a said support bearing axis on said main support frame;
   means for securing each auxiliary frame in selected pivoted positions with respect to said main support frame;
   toothed rotary rakes carried in groups on said auxiliary frames for rotation about generally vertical axes and ground engaging wheels on said auxiliary frames for at least in part supporting same, said auxiliary frames having at least one said position in which said wheels lie substantially on a common rotation axis;
   drive means for rotatably driving said rotary rakes and including a a main drive unit drivable from the tractor;
   said machine further including the improvement wherein:
   said main support frame comprises a pull frame part and a support frame part, said pull frame part being carried by said three point attachment device on said tractor and said support frame part carrying said support bearings;
   pivot joint means pivotally supporting said support frame part on said pull frame part and having a pivot axis lying substantially above said common rotation axis of said wheels and being parallel thereto, and adjusting spindle means actuable for adjusting said support frame part with respect to said pull frame part about said axis of said pivot joint means.

2. The machine of claim 1 in which said adjusting spindle means extends forward from said pull frame part sufficient for adjustment from the seat of the tractor secured to the machine.

3. The machine of claim 1 in which said support frame part is V-shaped, wherein the central, apex portion thereof is disposed rearwardmost and said V-shape opens forward toward the tractor engaging portion of said machine, said machine being bilaterally symmetrical with the central portion of said V-shaped lying in the plane of symmetry of the machine, said pivot joint means on said pull frame part engaging said central portion of said support frame part.

4. The machine of claim 1 in which said drive means includes, for each auxiliary frame, a drive shaft means extending from said main drive unit toward the corresponding said support bearing, a drive shaft piece coupled to said drive shaft means through a universal joint disposed substantially on the approximately vertical pivot axis of the corresponding support bearing, said drive shaft piece extending rearward toward said auxiliary frame and having a rearward universal joint, a rotary rake gear unit on said auxiliary frame and driven through said rearward universal joint for rotatably driving the corresponding rotary rakes, such that the auxiliary frame can be pivoted about said vertical pivot axis of said support bearing and with respect to said main support frame without need for disconnecting said rotary rake gear unit from said main drive unit.

5. The machine of claim 4 in which said drive shaft means comprises a forward shaft and an intermediate shaft coupled through a third universal joint and including means on said support frame part supporting said intermediate shaft for rotation with respect thereto.

6. The machine of claim 1 in which said pivoted positions of said auxiliary frames include an operating position and a transport position and, for pivoting the auxiliary frame from its operating position into its transport position, a traction cable, means pivotable with said auxiliary frame about said substantially vertical axis of said support bearing and fixed at one end of said traction cable, and adjustment means carried by said main support frame adjacent said tractor and operable from the seat of said tractor and connected to the other end of said traction cable for pulling same and therewith pivoting said auxiliary frame from said operating position to said transport position.

7. The machine of claim 6 including a rocker arm for each auxiliary frame, said rocker arm having its central portion pivotally supported on said support frame part, a guide pulley on the rearward end of said rocker arm, the intermediate portion of said traction cable being guided around said guide pulley so as to impart a bend to said traction cable in said intermediate part thereof, said means pivotable with said auxiliary frame comprising a pivot piece carrying said auxiliary frame and pivotally joining same to said support frame part at said approximately vertical support bearing pivot axis, releasable locking means for releasably locking said pivot piece against pivotal movement with respect to said support frame part and a release cable connecting said locking means with the forward end of said rocker arm, such that a pull on said release cable releases said locking means to permit pivotal movement of said auxiliary frame and tensioning of said traction cable both effects pivoting of said rocker arm to so pull said release cable and also thereafter to pivot said auxiliary frame from operating position to transport position.

8. The machine of claim 7 in which said pivot piece has a locking edge provided with notches corresponding in number to the positions of said auxiliary frame and arranged circumferentially with respect to said substantially vertical pivot axis, said locking means comprising a notch arm pivotally mounted on said support frame part adjacent said pivot piece edge, means biasing said notch arm into a given said notch to lock said auxiliary frame and support frame part against relative pivotal movement about said vertical axis, said release cable being secured to said notch arm in opposition to said biasing means so as to pull said notch arm out of engagement with said pivot piece to unlock same.

9. The machine of claim 7 including a secured traction cable having one end also secured to said pivot piece but on the laterally opposite side of said substantially vertical pivot axis from said first-mentioned traction cable end, the other end of said second traction cable also being secured to said adjustment means but in such a manner that tensioning of one said traction cable by said adjustment means loosens the other said traction cable and vise-versa, said pulley on said rocker arm being a two-part pulley and supporting for movement in opposite longitudinal directions the intermediate portions of the two said traction cables, whereby tensioning of either said traction cable pivots the rocker arm in the same direction to release said locking means but then pivots said pivot piece in opposite directions.

10. The machine of claim 1 in which each auxiliary frame has a said pivoted position wherein it extends transversely of the direction of travel of the machine, such auxiliary frame having first and second rotary rakes thereon with the axes of rotation of such rotary rakes disposed at respective inner and outer portions of the auxiliary frame, means including said support bearing securing said auxiliary frames pivotally to said main support frame and further including for each auxiliary frame substantially horizontal pivot joint means having a pivot axis extending substantially parallel with the ground and also substantially in the direction of travel of the machine with the auxiliary frames substantially in line with each other and extending transverse to the path of travel, said substantially horizontal pivot axis being spaced closer to the rotation axis of the corresponding inner rotary rake than to the rotation axis of the corresponding outer rotary rake of that auxiliary frame.

11. The machine of claim 10 including a holding flange carried by each end portion of the support frame part above and adjacent the corresponding said horizontal pivot axis of the corresponding auxiliary frame, and a carrying chain extending from said holding flange to the longer, outer length portion of the auxiliary frame to limit downward pivotal movement of such auxiliary frame outer portion about said substantially horizontal pivot axis of such auxiliary frame.

12. The machine of claim 11 including a spring element connected in series with said carrying chain such that said chain resists said pivotal movement of said auxiliary frame about said substantially horizontal axis in a resilient rather than positive manner.

13. The machine of claim 11 in which said carrying chain includes an adjustable length portion.

14. The machine of claim 11 in which said holding flange supportingly engages said carrying chain in a zone forward along the direction of travel from the corresponding support bearing.

15. The machine of claim 12 in which said support bearing includes an upstanding pivot pin carried by the adjacent end of said support frame part, a pivot piece pivotably mounted on said upstanding pivot pin for pivotable motion substantially in a horizontal plane, said pivot piece carrying said substantially horizontal pivot joint means of said auxiliary frame, said holding flange including a central portion pivotally surrounding said upstanding pivot pin and in turn carrying a first portion extending therefrom for carrying said chain at a second portion engageable with said support frame part to limit though not entirely prevent pivotal motion of said holding flange on said upstanding pivot pin.

* * * * *